US010693913B2

(12) United States Patent
Mani et al.

(10) Patent No.: US 10,693,913 B2
(45) Date of Patent: Jun. 23, 2020

(54) SECURE AND POLICY-DRIVEN COMPUTING FOR FOG NODE APPLICATIONS

(71) Applicant: Cisco Technology, Inc., San Jose, CA (US)

(72) Inventors: Selvaraj Mani, Milpitas, CA (US); Swapna Yelamanchi, Fremont, CA (US); Amarender Musku, Santa Clara, CA (US); Sri Hari Kumaran Masilamani, San Jose, CA (US); Deep Preet Singh, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 15/581,455

(22) Filed: Apr. 28, 2017

(65) Prior Publication Data
US 2018/0316725 A1 Nov. 1, 2018

(51) Int. Cl.
*H04L 29/06* (2006.01)
*H04L 29/08* (2006.01)
*H04W 4/70* (2018.01)

(52) U.S. Cl.
CPC .............. *H04L 63/20* (2013.01); *H04L 63/08* (2013.01); *H04L 63/0892* (2013.01); *H04L 63/10* (2013.01); *H04L 63/1433* (2013.01); *H04L 67/125* (2013.01); *H04W 4/70* (2018.02)

(58) Field of Classification Search
None
See application file for complete search history.

(56) References Cited

U.S. PATENT DOCUMENTS

| | | | |
|---|---|---|---|
| 7,284,054 B2 | 10/2007 | Radhakrishnan | |
| 8,869,235 B2 | 10/2014 | Qureshi et al. | |
| 9,419,953 B2 | 8/2016 | Von Bokern et al. | |
| 2014/0165130 A1* | 6/2014 | Zaitsev | G06F 21/00 726/1 |
| 2014/0189778 A1* | 7/2014 | Li | H04L 63/20 726/1 |
| 2015/0359017 A1* | 12/2015 | Xue | H04W 12/06 370/338 |
| 2016/0014159 A1 | 1/2016 | Schrecker et al. | |
| 2016/0337474 A1 | 11/2016 | Rao | |
| 2016/0359695 A1* | 12/2016 | Yadav | G06N 99/005 |
| 2016/0381075 A1* | 12/2016 | Goyal | H04L 63/20 713/176 |
| 2017/0039378 A1* | 2/2017 | Skipper | G06F 21/6209 |

OTHER PUBLICATIONS

Pahl et al., "A Container-based Edge Cloud PaaS Architecture based on Raspberry Pi Clusters", IEEE Computer Society, Aug. 22-24, 2016 (Year: 2016).*

* cited by examiner

*Primary Examiner* — James R Marandi
(74) *Attorney, Agent, or Firm* — Behmke Innovation Group LLC; James M. Behmke; James J. Wong

(57) ABSTRACT

In one embodiment, a device in a network gathers characteristics of a container application on the device. The device provides the gathered characteristics of the container application for security assessment. The device receives an indication of the security assessment based on the provided characteristics of the container application. The device controls execution of the container application based on the received indication of the security assessment.

18 Claims, 5 Drawing Sheets

US 10,693,913 B2

SECURE AND POLICY-DRIVEN COMPUTING FOR FOG NODE APPLICATIONS

TECHNICAL FIELD

The present disclosure relates generally to computer networks, and, more particularly, to secure and policy driven computing for fog node applications.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

A defining characteristic of many IoT nodes is their constrained nature in terms of computational resources. Notably, IoT nodes typically differ from traditional computing devices in that they often have very limited processing power, memory, computational speed and bandwidth, and power (e.g., a battery-powered sensor). In some cases, computations associated with IoT nodes may be offloaded to remote data centers and/or cloud-based services. For example, a sensor reading may be sent to a remote monitoring service for analysis via the Internet. However, as would be appreciated, doing so also increases the overall overhead of the network, as it requires communications back and forth between the analysis server/service and the endpoint node. Thus, recent efforts have been made to move these computations away from the cloud and into the "fog," e.g., into the nodes/devices in or at the edge of the local network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
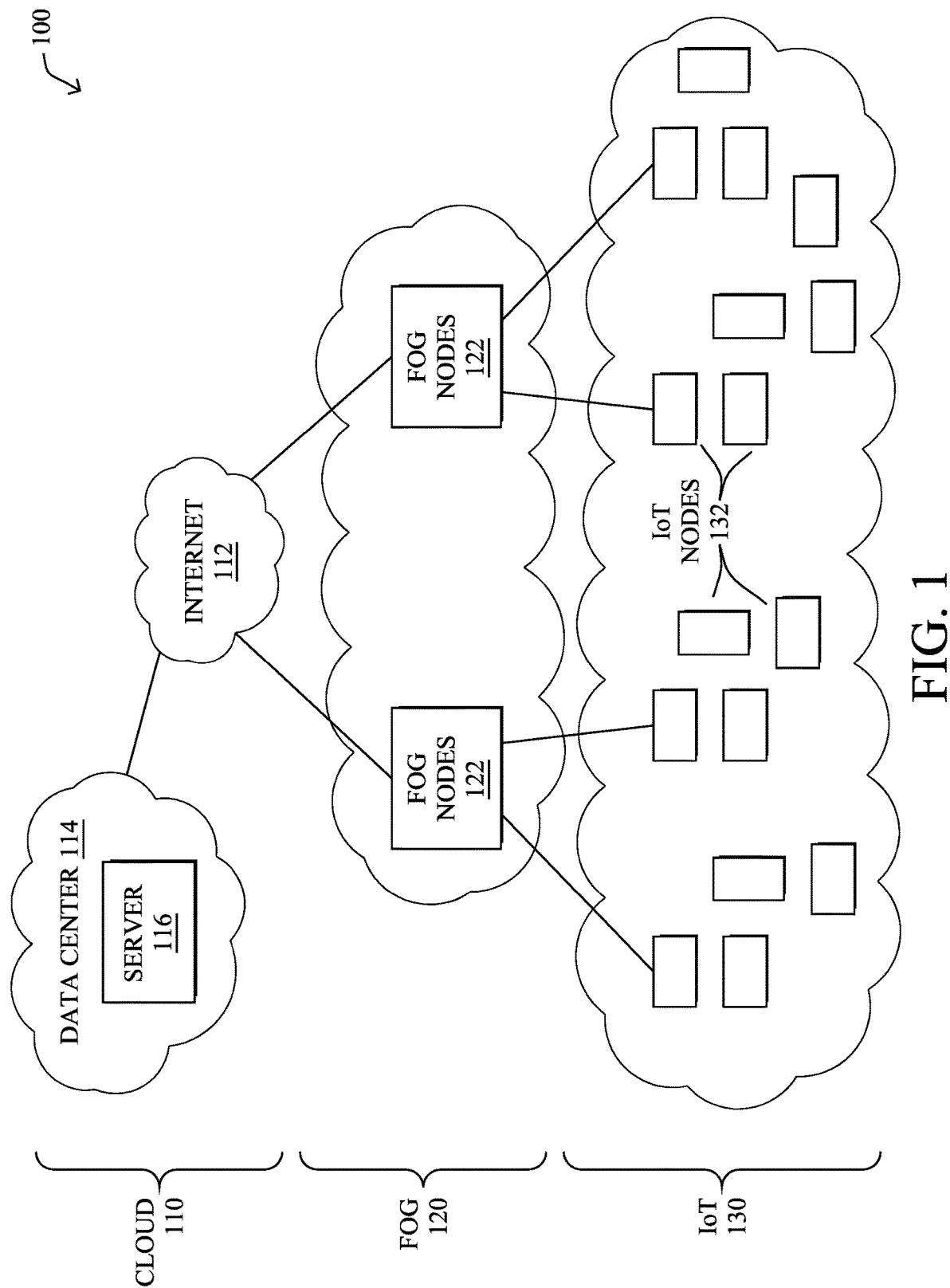
FIG. 1. illustrates an example communication network.

According to one or more embodiments of the disclosure, a device in a network gathers characteristics of a container application on the device. The device provides the gathered characteristics of the container application for security assessment. The device receives an indication of the security assessment based on the provided characteristics of the container application. The device controls execution of the container application based on the received indication of the security assessment.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services.

Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. For example, nodes/devices 122 may include, but are not limited to, network routers, switches, gateways, and other networking devices.

Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
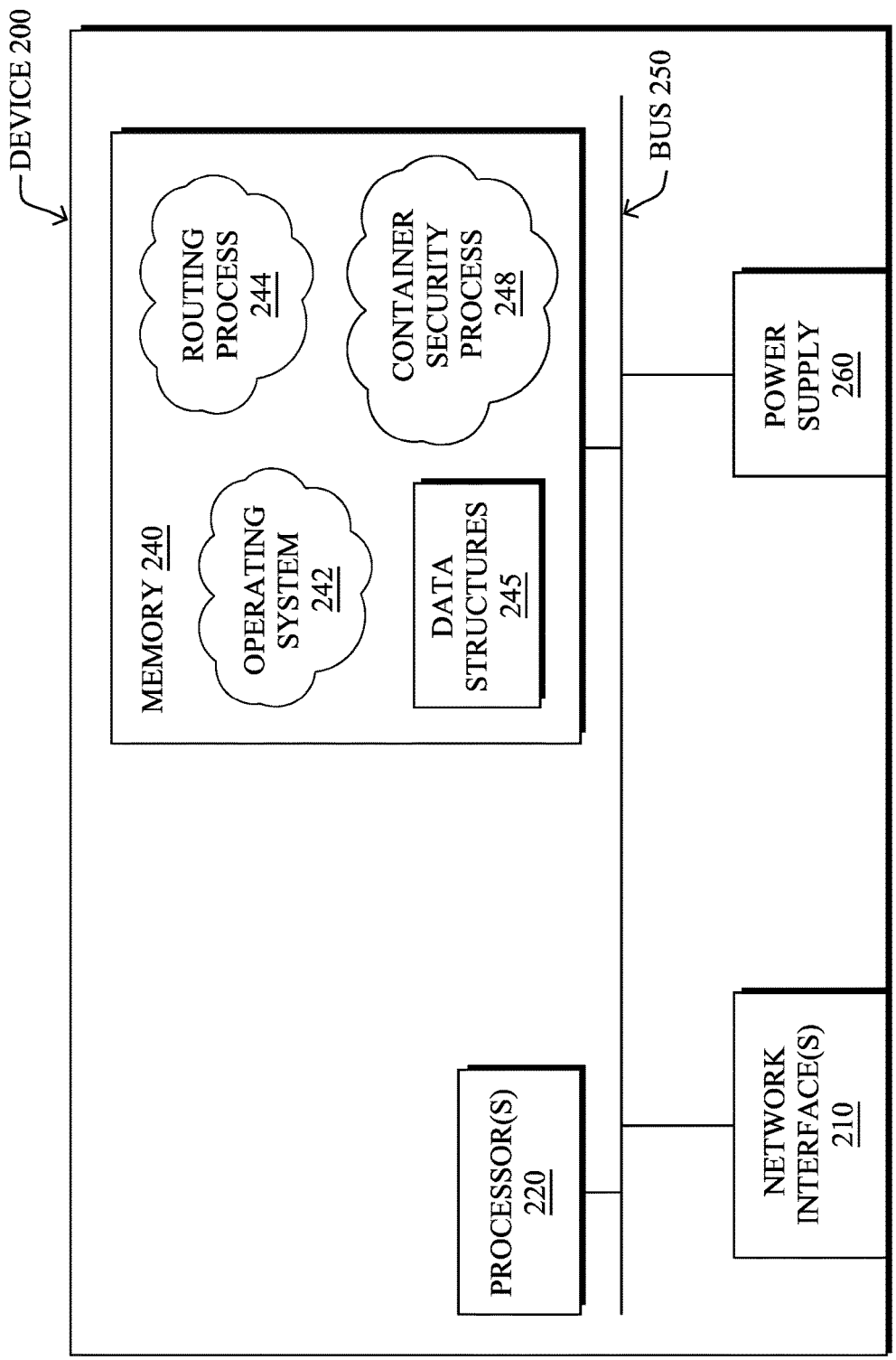
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise routing process/services 244 and/or an illustrative container security process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 include computer executable instructions executed by processor 220 to perform functions provided by one or more routing protocols, such as an Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

Another example protocol that routing process 244 may implement, particularly in the case of LLN mesh networks, is the Routing Protocol for Low Power and Lossy (RPL), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

As noted above, fog computing generally refers to the computing infrastructure (e.g., applications, resources, networking devices, etc.) located at the edge of the network where the data originates from the local devices/nodes in the towards the cloud/Internet. Fog infrastructure plays a crucial role in the IoT paradigm by analyzing the data locally and taking the proper actions based on the analyzed data in considerably less time than using cloud-based approaches. This is useful for machine critical applications where the actions should be taken in near to real time. In addition, fog-based approaches consume less bandwidth between the local network and the WAN.

Typically, the fog infrastructure is hosted on edge routers, switches, gateways, smart hubs, smart mobile devices, and the like. For example, IOx™ from Cisco Systems, Inc. provides a fog computing infrastructure that allows micro services to be hosted on networking elements (e.g., routers, etc.) located near the nodes originating the data. IOx and similar methodologies leverage containers to execute these micro services/applications and analyze the data originated from the sources. By definition, each micro service container will serve the purpose for which it is instantiated.

In other embodiments, these services/applications may be executed in their own virtual machines (VMs). In the case of VM-based implementations, each such application may be executed within its own separately run operating system with its own set of binaries and libraries, with a hypervisor overseeing the execution of each VM. In containerized implementations, however, the operating system itself, the binaries, and/or libraries may be shared across applications as necessary on the executing device and allowing for a much smaller footprint in comparison to VM-based approaches.

In other words, each containerized micro service/application on the fog device will have its own network, storage, name spaces, etc., that are allocated while launching the container. From the security perspective of the network element/fog device, each container will act as a single computing node/entity. However, there is no mechanism today to provide the network security/network policy for the container while launching the application instance. Notably, user security in place today performs the security operations within the container itself using, e.g., PAM, LDAP, SELinux, and the like. But, there is no way to restrict launching an application on the network, restricting the type of access the application has to network resources, and/or restricting the type of application to be launched inside the container.

Secure and Policy Driven Computing for Fog Node Applications

The techniques herein provide a secure and policy driven approach to launching containerized, fog node applications. In some aspects, the hosting framework of the fog device may gather the characteristics of the containerized application/micro service (e.g., prior to, or during launch of the container) and provide the characteristics to a security mechanism for assessment. Such a security mechanism may be local to the fog device, be provided by a remote server, such as an access control engine in the network, or both, in various cases. Based on the security assessment, the fog device may control the execution of the container application such as by preventing loading of the container application, restricting access to certain resources, or the like.

Specifically, according to one or more embodiments of the disclosure as described in detail below, a device in a network gathers characteristics of a container application on the device. The device provides the gathered characteristics of the container application for security assessment. The device receives an indication of the security assessment based on the provided characteristics of the container application. The device controls execution of the container application based on the received indication of the security assessment.

Illustratively, the techniques described herein may be performed by hardware, software, and/or firmware, such as in accordance with the container security process 248, which may include computer executable instructions executed by the processor 220 (or independent processor of interfaces 210) to perform functions relating to the techniques described herein, e.g., in conjunction with routing process 244.

Figure 3:
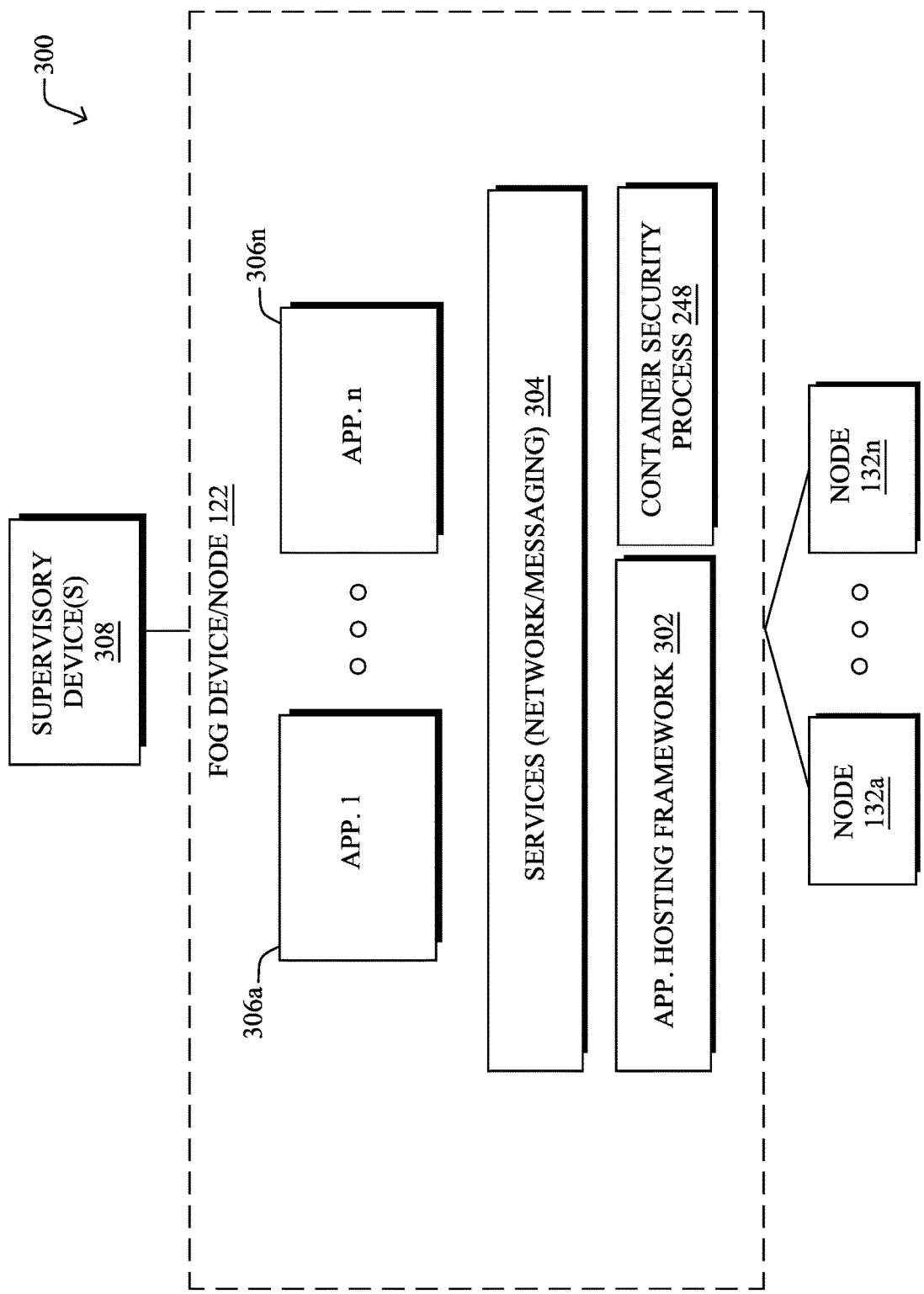
FIG. 3 illustrates an example architecture for a fog computing device/node.

Operationally, FIG. 3 illustrates an example architecture 300 for a fog computing device/node 122. In various embodiments, fog computing device/node 122 may be a networking device within the local network, such as a router, which may be located at the edge of the local network. In other embodiments, fog computing device 122 may be another form of networking device (e.g., a switch, etc.) and/or another endpoint node in the network. Generally, as part of the fog computing framework, the fog computing device may maintain and execute any number of micro services/applications 306 (e.g., a first through nth application) that process data from nodes 132 in the network and/or provide control commands to the nodes (e.g., a first through nth IoT node).

Assume for purposes of illustration that endpoint node 132a is a sensor or actuator in the network that captures sensor data and/or performs operations in response to receiving control commands. For example, if endpoint node 132a is a security camera, it may capture audio and/or video sensor data from the surrounding area. In addition, the camera may have a number of configurations that can be set via actuation control commands sent by a corresponding application 306 hosted by fog device 122. For example, such a control command may adjust the pan, tilt, or zoom of the security camera.

To support the execution of applications 306, fog computing device 122 may execute an application hosting framework 302 that allows for any number of client applications 306 to be executed locally. An example of such a hosting framework is IOx™ by Cisco System, Inc. In various embodiments, hosting framework 302 may launch applications 306 as container applications or, alternatively, within VMs, thereby providing a degree of isolation from one another.

Application hosting framework 302 may also use network/messaging services 304 to relay data packets between client applications 306 and any number of distributed nodes in the network, such as an endpoint node 132. For example, IOx™ by Cisco Systems, Inc. provides an application hosting framework that uses network/messaging services to relay data packets between the locally-hosted applications and distributed nodes in the network. In some embodiments, container security process 248 may also be implemented as part of application hosting framework 302, to provide security functions regarding the execution of applications 306.

Typically, one or more supervisory devices 308 may be present in the local network of fog device 122 and/or be located remotely therefrom, such as in an operations center or a cloud-based service. During operation, supervisory device(s) 308 may provide at least some degree of control over fog device 122. For example, supervisory device(s) 308 may deploy applications 306 for execution by fog node 122 and/or manage the functions of fog device 122. Supervisory device(s) 308 may further include devices that also provide other services or functions within the network. For example, in one embodiment, supervisory device(s) 308 may include an access control engine that manages the access and security regarding nodes joining the local network (e.g., a mobile user device joining the network, etc.).

According to various embodiments, container security process 248 may gather a set of characteristics (e.g., parameters and other information) during launching of the container (pre- and/or post-launch). Such characteristics may include, but are not limited to, the image parameters, network parameters, exposed ports, image layers, library versions, or any other information regarding the container application 306. In turn, container security process 248 may send these collected characteristics to a local authentication, authorization, and accounting (AAA) service on fog device 122 and/or to an external posture validation server, such as an access control engine (e.g., an Identity Services Engine (ISE) by Cisco Systems or the like), to validate the characteristics of the container application. Based on this evaluation, a security policy can be assigned to the container application 306 such as 'deny launch,' 'deny network access,' 'deny storage,' etc., and used by container security process 248 to control the execution of the container application 306.

the techniques can be implemented using a library or other entity for application hosting framework 302 referred to herein as a "Secure Applications at Fog Edge (SAFE)" process. For example, the SAFE client can be mounted to the container rootfs during activation of the application. During operation, the SAFE client will do all of the brokerage actions, to communicate about the security parameters of the container. In some embodiments, the SAFE client may initially calculate a hash (e.g., SHA256, etc.) of the rootfs and store the hash in a container metadata file. In some implementations, this hash can be used by an off-box profiler (e.g., one of supervisory devices 308) to validate the installed application images. Notably, this step can be performed to ensure that the installed image on the fog device matches the 'golden' image of an organization, before launching or installing the application on the fog device.

Before the container is started, the SAFE client may be mounted onto the base rootfs of the container. Then, when the container starts, an IP address for the container can be obtained via static addressing, using the Dynamic Host Configuration Protocol (DHCP), or the like. Once the network is up, the SAFE client may inform the network element about the details of the container using a secure transport such as the HyperText Transfer Protocol Secure (HTTPS), Extensible Authentication Protocol (EAP), EAP over User Datagram Protocol (EAPoUDP), or the like. In turn, the network element/fog device may apply an access control list (ACL), to drop all of the traffic for the client on the port.

In various embodiments, the SAFE client may collect all of the posture details of the container application and/or file system (e.g., characteristics) and relay this information to the hosting network element/fog device. The hosting fog device can then either take action locally or, alternatively, send the collected posture information/characteristics to an access control engine, such as an ISE. The posture details/characteristics of the container are then analyzed by the local or remote engine, which sends an indication of the security assessment and/or determined policy to the network element. These assessment results can then be used to control the execution of the container. For example, the assessment response may be sent as Security Assertion Markup Language (SAML) assertions to the SAFE client, which can restrict the control group (cgroup) settings, accordingly.

Figure 4:
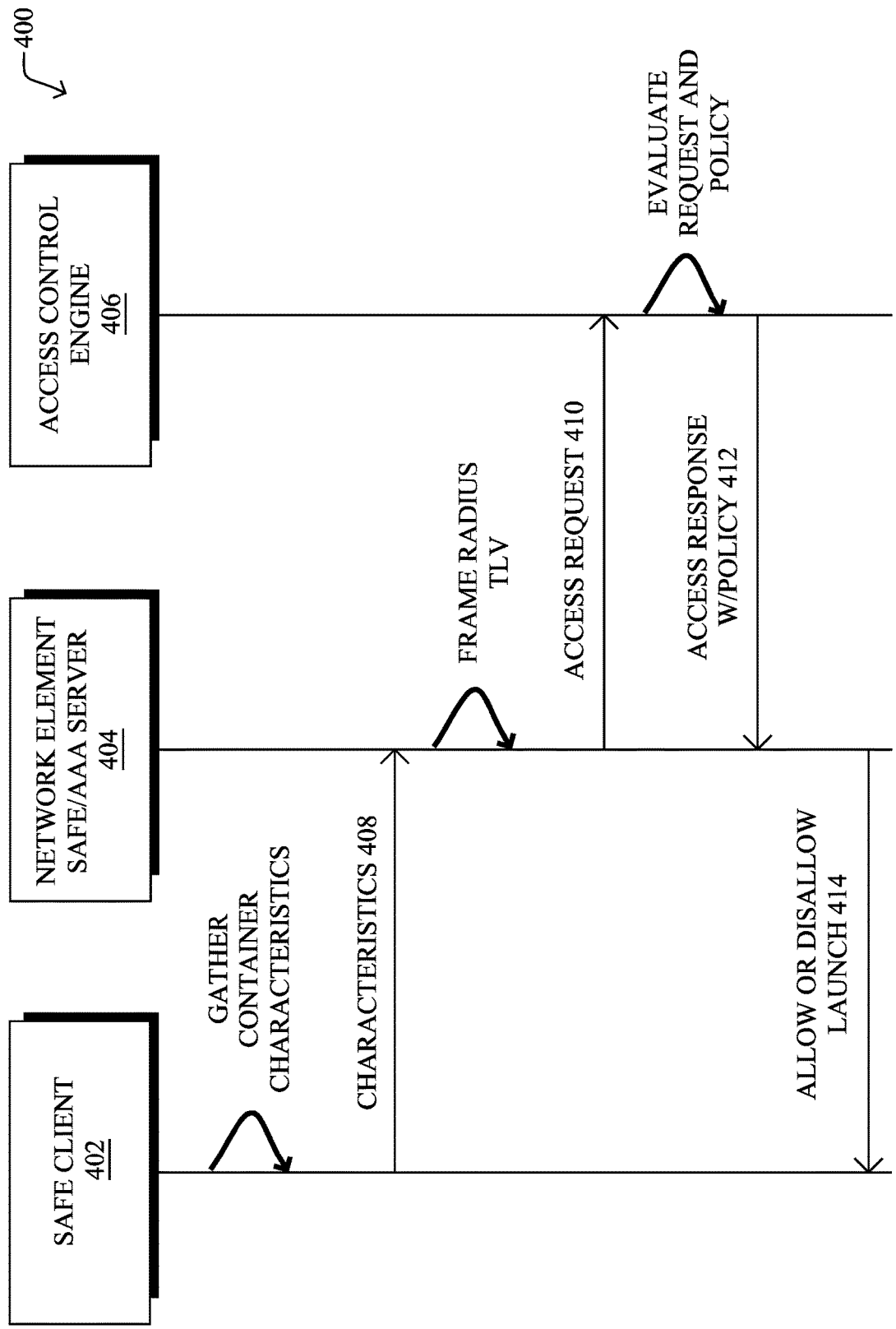
FIG. 4 illustrates an example flow diagram for implementing security for a container application.

FIG. 4 illustrates an example flow diagram for implementing security for a container application, in accordance with certain embodiments. As shown, SAFE client 402 may communicate with a local SAFE server/AAA 404 on the network element/fog device and/or with an access control engine 406 that may be located remotely in the network. For example, access control engine 406 may be an ISE server by Cisco System, Inc., or the like, that provides access control services to the local network in which the fog device is located.

As shown, the SAFE client 402 may gather the characteristics of the container application during launch. Such characteristics may include, but are not limited to, image parameters, network parameters, exposed ports, image layers, or library versions of the container application. In turn, the SAFE client 402 may send a message 408 to the local SAFE server 404 of the network element/fog device that includes the gathered characteristics. The transport mechanism for message 408 may be HTTPS, EAPoUDP, or the like.

Based on the received characteristics in message 408, the local SAFE server 404 may formulate the characteristics as type-length-value(s) (TLVs) for communication to the remote access control engine 406. For example, the container characteristics may be formulated as one or more Remote Authentication Dial-In User Service (RADIUS) TLVs. In turn, the local SAFE server 404 may send an access request 410 to the remote access control engine 406 that includes the formulated TLVs/container characteristics.

The remote access control engine 406 may evaluate access request 410 and determine the security posture of the container application. For example, the characteristics of the container application may indicate that the application will be using certain ports that are restricted for use in the network by security policy. Based on this security assessment, the access control engine 406 may determine an appropriate execution policy for the container application and provide an indication of the assessment (e.g., the policy, a binary decision as to whether the container can load, or the like) to the SAFE server 404 of the networking element/fog device. For example, access control engine 406 may send an access response message 412 with the determined policy back to the SAFE server 404 of the networking element/fog device.

In turn, the SAFE server 404 may send a notification 414 back to SAFE client 402 that indicates whether the launch of the container application is allowed or disallowed and, in some cases, under which conditions. Based on this, the SAFE client 402 may control the execution of the container application, such as by preventing the container application from launching at all, restricting access of the container application to certain network or computing resources, or the like.

Figure 5:
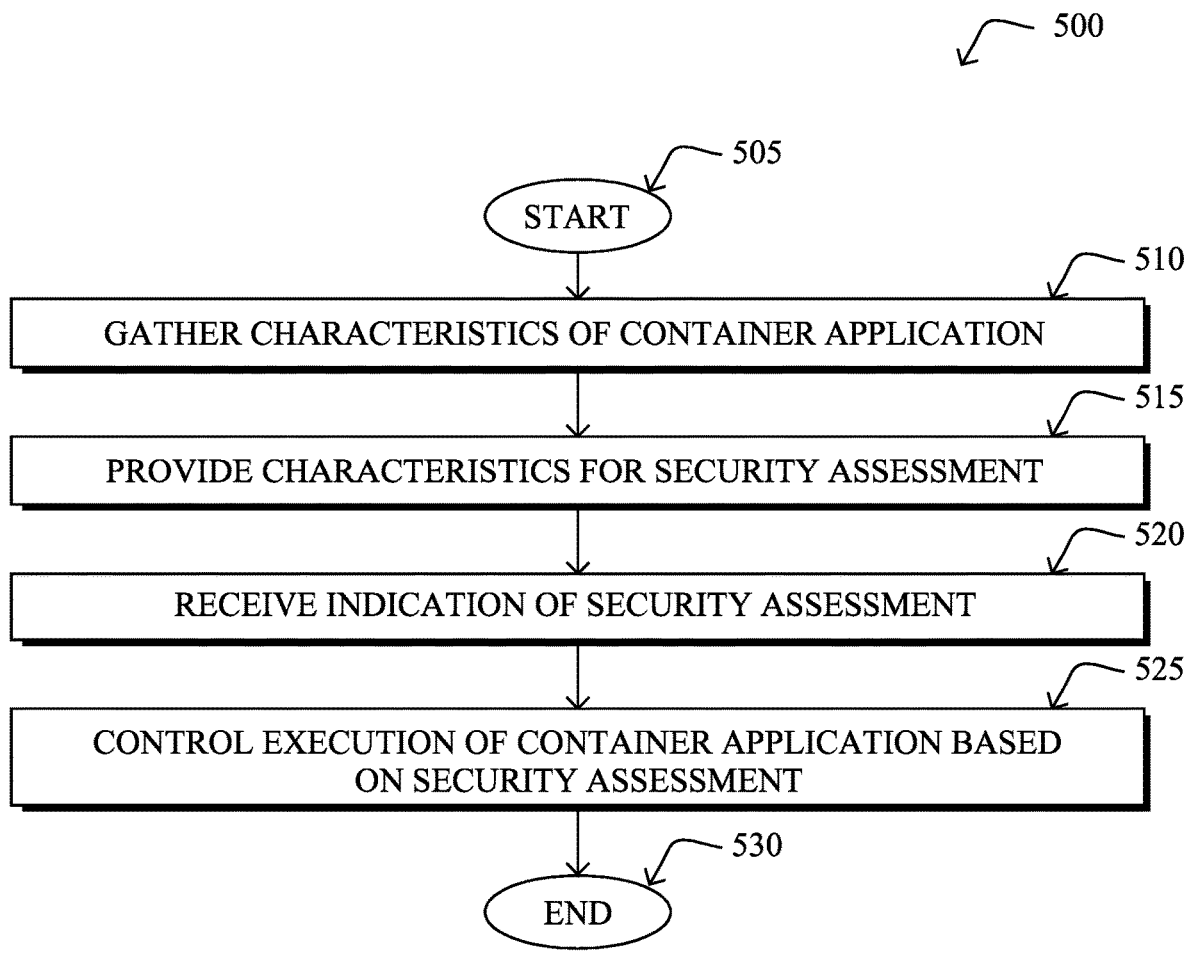
FIG. 5 illustrates an example simplified procedure for providing security to a container application.

FIG. 5 illustrates an example simplified procedure for providing security to a container application in a network, in accordance with one or more embodiments described herein. For example, a non-generic, specifically configured device (e.g., device 200) may perform procedure 500 by executing stored instructions (e.g., process 248). The procedure 500 may start at step 505, and continues to step 510, where, as described in greater detail above, the device may gather characteristics of a container application prior to, or during, loading of the container application on the device. For example, the container application may be a fog computing-based application and the device may be a networking device such as a router, switch, etc. Exemplary characteristics of the application may include, but are not limited to, image parameters, network parameters, exposed ports, image layers, or library versions of the container application.

At step 515, as detailed above, the device may provide the characteristics of the container application for security assessment. In some embodiments, the assessment may be performed locally on the device by analyzing the characteristics. In other embodiments, the assessment may be performed remotely, such as by an access control engine in the network. In the remote case, the device may generate and transmit the gathered characteristics via a TLV of a RADIUS-protocol message or the like.

At step 520, as detailed above, the device may receive an indication of the security assessment. For example, the indication may include an indication that loading of the container application should be disallowed and blocked by the device. In another example, the indication may comprise a security policy for the container application that limit the resources (e.g., computing resources of the device, network resources, etc.) that can be used by the container application during execution.

At step 525, the device may control execution of the container application based on the security assessment, as described in greater detail above. In one embodiment, the device may simply prevent launching of the container application. In further embodiments, the device may restrict, limit, and/or isolate the resources or functions performed by the container application. For example, the container application may be restricted from using certain ports, communicating with certain devices in the network, or the like. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow a fog computing device to apply a degree of security to the container applications executed by the device. Further, the techniques can be used to protect network resources from unauthorized access by the container/fog applications, as part of the application hosting framework. The techniques herein also allow for the secure and dynamic application of security policies to micro services/applications executed in the fog.

While there have been shown and described illustrative embodiments that provide for secure and policy driven computing for fog node applications, it is to be understood that various other adaptations and modifications may be made within the spirit and scope of the embodiments herein. For example, while certain protocols are shown, such as RADIUS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a client that is mounted at a base rootfs of a container application and prior to execution of the container application on a device of a network, characteristics of the container application, wherein the container application processes data from another device in the network or sends control commands to the other device, further wherein the characteristics of the container application include a hash of the rootfs, network parameters to be used by the container application, and exposed ports to be used by the container application, further wherein the device comprises at least one of: a network router, a network switch, a network gateway, or a network smart hub;
   providing, by the device, the determined characteristics of the container application for security assessment;
   receiving, by the device, an indication of the security assessment based on the provided characteristics of the container application, wherein the indication of the security assessment includes an indication as to whether an off-box profiler has validated the container application by using the hash; and
   controlling, by the device, execution of the container application based on the received indication of the security assessment.

2. The method as in claim 1, wherein controlling execution of the container application based on the received indication of the security assessment comprises:

preventing, by the device, launching of the container application on the device.

3. The method as in claim 1, wherein providing the determined characteristics of the container application for security assessment comprises:
transmitting, by the device, the determined characteristics of the container application to an access control engine in the network that performs the security assessment based at least on the network parameters to be used by the container application and exposed ports to be used by the container application.

4. The method as in claim 3, wherein the determined characteristics are transmitted to the access control engine via a Remote Authentication Dial-In User Service (RADIUS) protocol message.

5. The method as in claim 1, wherein the characteristics of the container application further comprise one or more of: image parameters, image layers, or library versions of the container application.

6. The method as in claim 1, wherein determining the characteristics of the container application on the device comprises:
computing, by the device, the hash using one or more images associated with the container application.

7. The method as in claim 1, wherein the determined characteristics of the container application for security assessment are provided to a local authentication process of the device.

8. The method as in claim 1, wherein controlling execution of the container application based on the received indication of the security assessment comprises:
limiting, by the device, network resource usage by the container application based on the received indication of the security assessment.

9. An apparatus, comprising:
one or more network interfaces to communicate with a network;
a processor coupled to the network interfaces and configured to execute one or more processes; and
a memory configured to store a process executable by the processor, the process when executed operable to:
determine, prior to execution of a container application that is a fog-computing application, characteristics of the container application on the apparatus, wherein the container application processes data from another device in the network or sends control commands to the other device, further wherein the characteristics of the container application include a hash of a rootfs of the container application that is computed by a client mounted at a base rootfs of the container application, network parameters to be used by the container application, and exposed ports to be used by the container application, further wherein the apparatus comprises at least one of: a network router, a network switch, a network gateway, or a network smart hub;
provide the determined characteristics of the container application for security assessment;
receive an indication of the security assessment based on the provided characteristics of the container application, wherein the indication of the security assessment includes an indication as to whether an off-box profiler has validated the container application by using the hash; and
control execution of the container application based on the received indication of the security assessment.

10. The apparatus as in claim 9, wherein the apparatus controls execution of the container application based on the received indication of the security assessment by:
preventing launching of the container application on the apparatus.

11. The apparatus as in claim 9, wherein the apparatus provides the determined characteristics of the container application for security assessment by:
transmitting the determined characteristics of the container application to an access control engine in the network that performs the security assessment based at least on the network parameters to be used by the container application and exposed ports to be used by the container application.

12. The apparatus as in claim 11, wherein the determined characteristics are transmitted to the access control engine via a Remote Authentication Dial-In User Service (RADIUS) protocol message.

13. The apparatus as in claim 9, wherein the characteristics of the container application comprise one or more of: image parameters, image layers, or library versions of the container application.

14. The apparatus as in claim 9, wherein the apparatus determines the characteristics of the container application on the apparatus by:
computing, by the client, the hash using one or more images associated with the container application.

15. The apparatus as in claim 9, wherein the determined characteristics of the container application for security assessment are provided to a local authentication process of the apparatus.

16. The apparatus as in claim 9, wherein the apparatus controls execution of the container application based on the received indication of the security assessment by:
limiting network resource usage by the container application based on the received indication of the security assessment.

17. A tangible, non-transitory, computer-readable medium storing program instructions that cause a device in a network to execute a process comprising:
determining, by a client mounted at a base rootfs of a container application of a device and prior to execution of the container application on a device, characteristics of the container application, wherein the container application processes data from another device in the network or sends control commands to the other device, further wherein the characteristics of the container application include a hash of the rootfs, network parameters to be used by the container application, and exposed ports to be used by the container application, further wherein the device comprises at least one of: a network router, a network switch, a network gateway, or a network smart hub;
providing, by the device, the determined characteristics of the container application for security assessment;
receiving, by the device, an indication of the security assessment based on the provided characteristics of the container application, wherein the indication of the security assessment includes an indication as to whether an off-box profiler has validated the container application by using the hash; and
controlling, by the device, execution of the container application based on the received indication of the security assessment.

18. The tangible, non-transitory, computer-readable medium storing program instructions as in claim 17, the process further comprising:

computing, by the device, the hash using one or more images associated with the container application.

\* \* \* \* \*